Jan. 9, 1940.　　　　K. L. HENDERSON　　　2,186,138
PHOTOGRAPHY
Filed June 3, 1937　　　2 Sheets-Sheet 1
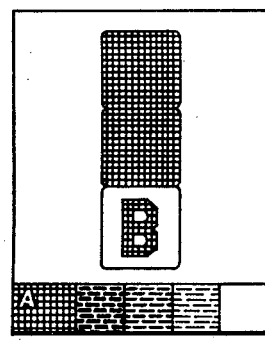 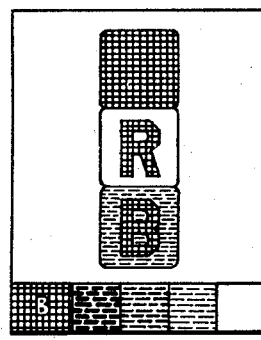 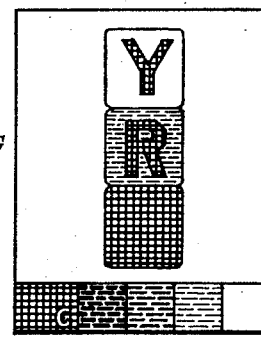
Fig.1　　　Fig.2　　　Fig.3
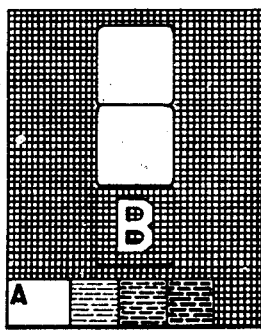 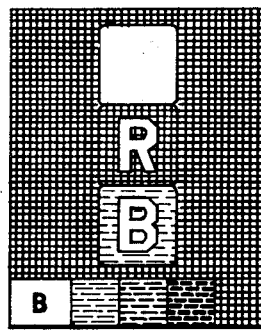 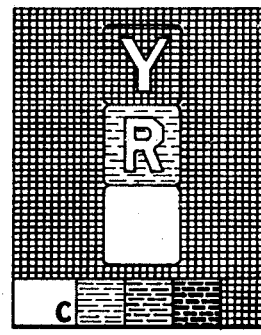
Fig.4　　　Fig.5　　　Fig.6
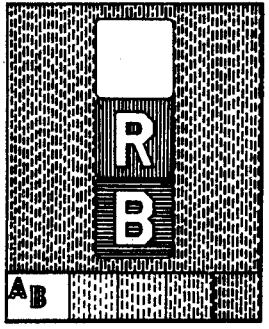 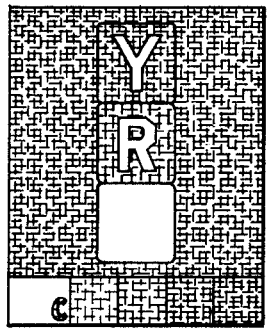 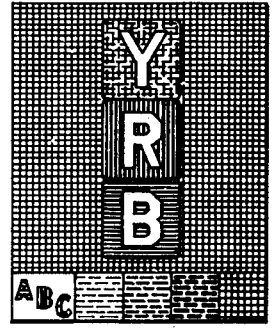
Fig.7　　　Fig.8　　　Fig.9
INVENTOR
Kenneth L. Henderson
BY D. Clyde Jones
ATTORNEY Jan. 9, 1940.   K. L. HENDERSON   2,186,138
PHOTOGRAPHY
Filed June 3, 1937   2 Sheets-Sheet 2
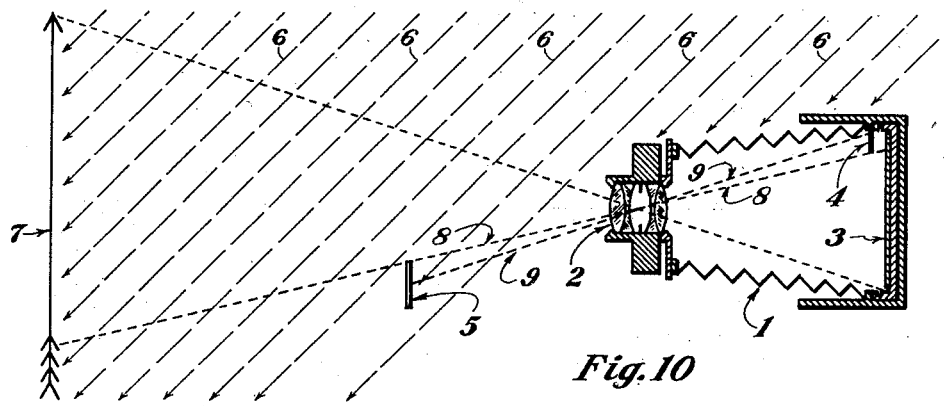
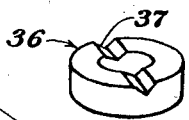
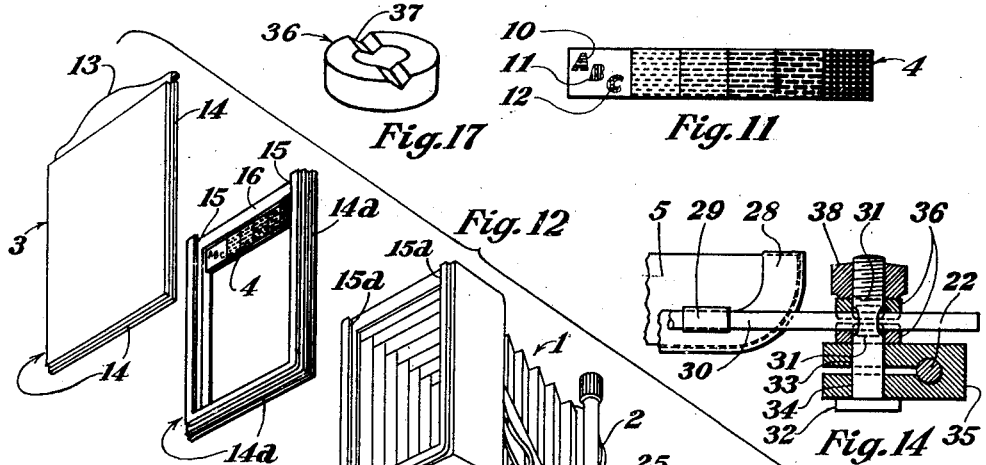
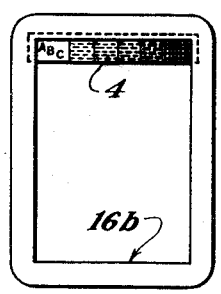
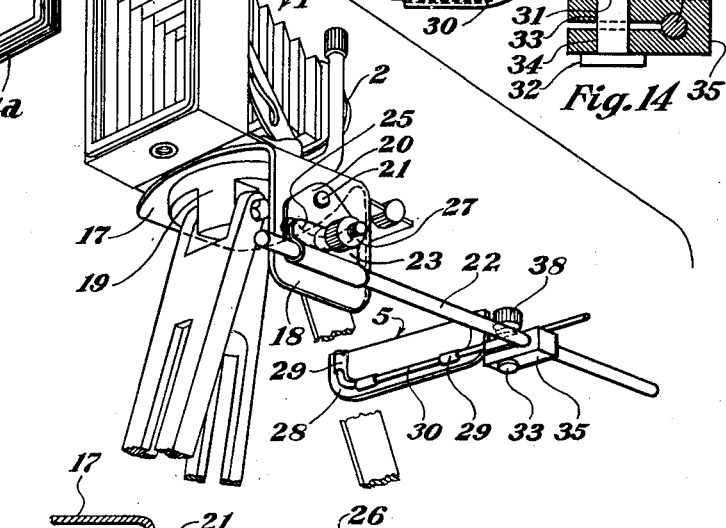
INVENTOR
Kenneth L. Henderson
BY
ATTORNEY Patented Jan. 9, 1940

2,186,138

UNITED STATES PATENT OFFICE 2,186,138

PHOTOGRAPHY

Kenneth L. Henderson, Rochester, N. Y.

Application June 3, 1937, Serial No. 146,233

13 Claims. (Cl. 95—2)

This invention relates to a method of and to apparatus for assisting in the more exact reproduction of tones in photographic prints.

In the preparation of certain monochrome prints and also color separation prints it is essential that the tones in the positive or other prints made from negatives, be exactly reproduced. In order to effect this result it has been the practice to provide a reference scale of graduated gray tones, that is a strip having areas progressively varying from white to black, representing the gamut of tone intensities. This scale was associated with the subject to be photographed in such position that after exposure and development, the image of the scale would appear along one margin of the negative or some other inconspicuous portion thereof. Since the scale image is used for purposes of comparison or for measurements, it greatest value results when its tone areas are of such size that they can be readily compared with another reference scale such as the scales appearing on other negatives or positives or by direct measurement by means of a densitometer or photometer.

If a scale image of useful size is desired, it will be appreciated that where the scale strip is associated with the object to be photographed, scale strips of different sizes must be provided dependent on the position of the subject with respect to the camera. While a scale strip of useful size can be associated with subjects of small size, mainly indoors, it becomes impractical to make and utilize a large enough scale for any useful purpose in the taking of distant scenes such as buildings and mountains.

In accordance with the present invention, novel apparatus including a scale of graduated gray tones varying from transparency to opaqueness is mounted within the camera to provide a suitable reference scale on the resulting negatives whereby the novel method, included in the invention, may be practiced.

In the making of color separation negatives in color photography, it has been the practice to mark on the plate holder or on the sensitive plate or film, a suitable identification mark indicating the color of the filter through which the negative has been taken. Such application of identification marks by the photographer is an added step in a process already complicated.

In accordance with the present invention, the transparent area of the above-mentioned reference scale is provided with three identification marks corresponding to the three color filters used in three color separation photography, these identification marks being of appropriate color so that when a suitable photo-sensitive strip is exposed thru a filter and developed, only one of the marks will appear conspicuously and this conspicuous mark will indicate the filter through which the negative is made.

The various features and advantages of the invention will appear from the detailed description and claims when taken with the drawings, in which Figs. 1, 2 and 3 represent three negatives respectively taken thru red, green and blue-violet filters; Figs. 4, 5 and 6 are positives respectively printed from the negatives of Figs. 1, 2 and 3; Fig. 7 is a composite color image made by superposing images of the positives of Figs. 4 and 5, after they have been converted by one of the several methods common in the art, to blue-green and magenta images respectively and Fig. 8 is a yellow color image produced by converting the positive of Fig. 6 by one of the several methods common in the art; Fig. 9 is a composite three color print made by superposing the images of the positives of Figs. 4, 5 and 6, after they have been converted to blue-green, magenta and yellow images respectively by one of the several methods common in the art; Fig. 10 is a diagrammatic showing of the apparatus of the present invention; Fig. 11 is a plan view of a strip of varying light transmission known as a graduated scale of gray tones and also having identifying characters thereon in appropriate colors properly related to the various filters through which negatives are to be exposed; Fig. 12 is a perspective view of a camera and the apparatus of the present invention attached thereto in partially exploded arrangement; Fig. 13 is a front view of a frame and a graduated tone scale which may be substituted for the corresponding scale mounting in Fig. 12; Fig. 14 is a view of a portion of the supporting apparatus of Fig. 12, a part thereof being shown in section; Fig. 15 is a detail of the clamping screw of the supporting apparatus of Fig. 16; Fig. 16 is a vertical section of a portion of the supporting apparatus of Fig. 12; and Fig. 17 is a perspective view of one of the clamping washers shown in Fig. 14.

Referring to the drawings, Figs. 1, 2 and 3 illustrate three negatives of a colored object, such as three child's playing blocks that have been photographed, Fig. 1 representing a negative NR taken on a color sensitized photosensitive strip through a red filter; Fig. 2 represents a negative NG taken on a color sensitized photosensitive strip through a green filter, and Fig. 3 illustrating a negative NBV likewise taken on a color sensitized photosensitive strip through a blue violet filter. It will be noted that a margin of each of these negatives has an image thereon of a reference tone scale 4 (Fig. 11), that of Fig. 1 being identified by the reference character S—1, the scale image of Fig. 2 by S—2 and the scale image of Fig. 3 by S—3. It will be noted that each scale comprises a series of areas of graduated gray tones progressively increasing in intensity from a transparent area at the right end to approximately an opaque area at the left end thereof. The manner of photographing the reference scale 4 on each negative will appear hereinafter. The preparation of these negatives, that is, their exposure and development follow the technique prescribed by the manufacturer of the photo-sensitive strip from which the negative is made, or other suitable technique.

After the negatives have been prepared, a positive PR (Fig. 4) is printed on a photosensitive strip and developed from the negative NR of Fig. 1. Also positive PG (Fig. 5) is similarly prepared from the negative of NG of Fig. 2 and a positive PBV (Fig. 6) is prepared from the negative NBV of Fig. 3. It will be noted that the reference scales S4, S5 and S6 respectively appear on these positives. However, the order and intensity of their tone patterns is reversed with respect to the corresponding scales in the negatives. In the making of these positives, it is important that corresponding areas of the scales in each of the three positives be of the same intensity. More than one method of procedure may be followed in order to obtain this result, but the following method is given by way of example. Test strips of photosensitive material are printed by exposures of various timed duration preferably from the scale S2 of the negative NG and developed in a bath of known temperature until a test strip is obtained having its gray tones of suitable intensity. The positive PG of Fig. 5 is printed and developed under the same conditions under which the satisfactory test strip was obtained. The positives PR and PBV of Figs. 4 and 6 can be similarly prepared from their negatives by the use of test strips made from the reference scales S1 and S3 of their respective negatives, the test strips in this instance being matched with the reference scale S—5 in the positive PG. It is to be understood that this technique is only one of several ways of procedure.

After the positives of Figs. 4, 5 and 6 have been obtained with their scale areas of equal intensities, the positives are converted to color images by one of the several methods common in the art; as for example: the positives are developed on the photo-sensitized gelatin emulsion of the photographic strip, then subjecting the developed positives to a bath which selectively insolubilizes the gelatin of the emulsions. After this, the emulsions are subjected to a bath of hot water to remove the still soluble parts of the gelatin emulsions, the remaining or insoluble portions being those which contain the reduced silver of the developed images. Thereafter, the remainder or insoluble portions of the gelatin emulsions are treated to make the developed images approximately invisible. Then each of the gelatin images or matrices thus formed, are caused to imbibe a dye of suitable color as noted hereinafter. The matrix prepared from the positive PR thus has a blue-green dye applied to its matrix surface, which dye is then applied to a suitable type of paper to prepare a blue impression of the original object. Similarly, the matrix prepared from the positive PG of Fig. 5 is coated with a magenta dye to apply a magenta impression on the same paper in superimposed relation to that of the blue-green impression to provide a resulting two-color print as shown in Fig. 7. Thereafter, the matrix prepared from the positive PBV of Fig. 6, thus has yellow dye applied thereto so that a yellow image similar to that of Fig. 8 can be superimposed on the print of Fig. 7 to provide the finished three-color print of Fig. 9. For the production of a transparent color print the dyes are allowed to dry on the surfaces of the matrices, afterward, the matrices being superimposed in registry to form the finished three color picture of Fig. 9.

It will be noted that in the lower lefthand corners of Figs. 1, 2 and 3, certain identifying characters A, B and C appear. These identifying characters appear in the respective negatives since the reference scale 4 (Fig. 11) in its transparent area has the character A, designated 10 printed in blue-green, the character B marked 11, printed in magenta, and character C indicated at 12, printed in yellow. Thus, when the negative NR (Fig. 1) is made by exposure through a red filter, the blue-green A will pass substantially no red rays, while the character B printed in magenta, and the character C printed in yellow will pass the red rays quite freely so that the characters B and C on the negative NR will be inconspicuous. Therefore, the negative NR will have the conspicuous identifying character A indicating that it was taken through a red filter. Similarly, when the negative NG (Fig. 2) is made the character B printed in magenta at 11 on the reference scale (Fig. 11) will pass substantially no green rays, while the characters A and C at 10 and 12 on the scale (Fig. 11) will pass green light rays freeely. In the making of the negative NBV of Fig. 3, the letter C printed in yellow at 12 on the reference scale will pass substantially no blue-violet rays, corresponding to the filter through which this negative was taken while characters A and B will pass freely the blue-violet rays. While for purposes of this description it has been assumed that the identifying characters B, C; A, C; and A, B are substantially obscured in the negatives NR, NG and NBV of Fig. 1, 2 and 3 respectively, actually no such complete color separation is possible in practice, but one of the identifying characters such as A, B or C will predominate and the other two characters will appear faintly so that the photographer will have no difficulty in determining through which filter a given negative was prepared.

In order to provide a suitable reference scale of graduated tone values on every negative, whether the negative is that of a near object or a very distant object, the method and apparatus of the present arrangement is developed. This apparatus will be understood by reference to Figs. 10 to 17 inclusive of the drawings.

Referring especially to Fig. 10 it will be seen that the light rays 6, which illuminate the subject matter 7, also illuminate the white surface 5. It will be understood that the subject matter and the white surface may be illuminated either by separate sources of light or by a single source of light. In Fig. 10, the light is shown coming from above and behind the camera in which case some of the rays striking surface 5, are reflected toward the lens 2. In the event that the light is coming from behind the subject 7, then the rays of light will fall on the forward side of the white surface 5. In the first case the white surface 5 may be either opaque or translucent as both will reflect a portion of the incident rays. In the second case, only translucent materials may be used for white surface 5. The rays which are reflected or refracted by the white surface 5 to the lens 2 are projected by the latter to the graduated scale 4. This scale comprises a strip having a series of tone areas progressively varying from transparency at one end to opaqueness at its other, so that it corresponds to the gamut of gray tones of various intensities encountered in negatives. The projected rays are absorbed by the neutral gray areas of the scale 4 in proportion to the density of the various areas thereof, upon which they are incident. The rays which are not absorbed reach the photographic strip such as plate or film 3 and form a negative image of the scale. Simultaneously with the photographing of the scale 4, the rays reflected from the subject matter 7 to the lens, are projected to the photographic strip 3 and form a negative record of the subject matter. The negative images of both the gray scale and the subject matter are thus recorded on one and the same plate or film.

It will be observed that the white surface 5 may be placed anywhere between the rays 8 and 9 (which are the limiting rays, projected, of the scale 4) and between infinity and the lens 2 and yet rays reflected or refracted by it will cause a negative record of the scale 4 to be made on the photographic plate or film provided such later position causes an image of 5 to fall upon scale 4. It is quite obvious that the size of surface 5 is increased with its distance from the lens. It is not necessary that the white surface 5 be correctly focused although it may be so focused without changing the results markedly. It is, obvious then, that because the white surface 5 is effective when near the lens 2, it is quite possible and also very convenient to support this element from the camera 1. Such an arrangement is shown in Fig. 12 which illustrates one arrangement for effecting this combination of a camera and a white surface. However, the invention is not limited to the arrangement shown, since other means will accomplish the same result.

In Fig. 12 the camera 1 is fitted with receptacle-ways 15a for the engaging flanges 14a of the frame 16 into which is fitted the scale 4. Frame 16 is also provided with receptacle ways 15 similar to 15a on the camera 1. The plate holder 3, having a removable dark slide 13, is made with suitable engaging flanges 14 which fit into ways 15 of frame 16. Thus when frame 16 is inserted into the camera 1 and plate holder 3 is fitted to frame 16, the relation of scale 4 and plate or film 3 are the same as their relation in Fig. 10.

An alternative way of accomplishing this relation of scale and plate or film is to attach the scale 4 to a thin frame 16b (Fig. 13) of flexible material such as cardboard, fibre, etc., and engage it in the last fold of the bellows, immediately forward of the receptacle 15a. To those skilled in the art it will be readily perceived that all of this can be accomplished by other arrangements and therefore the invention is not limited to the arrangements shown.

It will be further observed in Fig. 12, that the white surface 5 is preferably supported from the camera, altho it should be understood that the invention is not limited to this combination since the white surface can be mounted on a separate support properly positioned between the lens and the subject to be photographed.

The elements of the supporting structure include a bracket having a flat plate 17 and a flange 18 which is substantially at right angles to the plate. The plate 17 is held between the camera 1 and the top of the tripod head 19 by the tripod screw, which is not shown, but passes upward from the tripod head through an enlarged hole provided in plate 17 and threads into a socket in the camera. The plane of the flange 18 is substantially vertical and is adjustable with respect to the side of the camera 1. By loosening the tripod screw, plate 17, may be shifted to adjust flange 18 and the rod 22 carried thereby with respect to the side of the camera 1. The tripod screw may then be tightened to secure the parts in adjusted position. Plate 17 however, may be secured to the camera independently of the tripod screw, as for example, by means of a separate screw.

As shown in Figs. 12 and 16, a clamp 20 is pivoted to the flange 18 by means of the rivet 21. From Fig. 16, it will be seen that the clamp extends downwardly from the rivet 21 along the face of flange 18 to a point near the bottom edge thereof. The main body of the clamp is bent around the rod 22 and formed into the clamping tongue 23 which overlies and is parallel to the main body of the clamp 20. A key-headed screw 24 passes through the slot 25 in flange 18, which slot receives the key 26 of the screw 24 (Fig. 15) and also passes through circular holes in the main body and clamping tongue 23 of clamp 20. These circular holes are in alignment with one another and also with the slot 25 in leg 18. The slot 25 is arcuate in form and has as its center the rivet 21 and is just wide enough to receive key 26 of screw 24. The thumb nut 27 is threaded on screw 24.

By loosening nut 27 so as to disengage tongue 23, the position of clamp 20 and rod 22 carried thereby may be shifted on flange 18, to any desired position within the limits of slot 25. By tightening nut 27 on screw 24 the clamp is locked on the rod 22 and to the flange 18. The screw is held from turning by the engagement of key 26 in slot 25.

In Fig. 12 the white surface 5 is shown supported in frame 28. This frame 28 has three lugs 29 which grip the rod 30. The rod 30, which extends beyond one end of the frame 28, is engaged in a clamping unit carried on the forward end of rod 22.

As shown in detail in Fig. 14, a split clamping block 35 is mounted on the forward end of the rod 22. A screw 32 extends upwardly through apertures 33 and 34 in the ears of the clamp 35 and carries thereon a pair of washers having V-shaped grooves 37 in their opposed faces as shown in detail in Fig. 17. The shank of the screw is provided with an elongated aperture 31 through which the extended end of rod 30 passes freely. The rod 30 seats in the opposing V-shaped grooves of the washers 36. A nut 38 threaded on the outer end of screw 32 clamps the rod 30 between the washers 36 and locks the clamp 35 in adjusted position on the rod 22. By loosening nut 38, the white surface 5 carried in the frame 28 may be rotated about the axis of the rod 30 and the rod 30 may be extended or retracted through the hole 31 to any desired position along its free length. The rod 30 and the white surface 5 carried thereby may also be rotated about the axis of the screw 32. Clamp 35 and the parts carried thereby may be rotated about or shifted along the rod 22 to any desired position. By tightening the nut 38, white surface 5 will be held securely in its adjusted position.

By means of the various adjustments the white surface 5 can be adjusted to a wide variety of positions to accomplish the two main functions of the white surface, viz.: (1) to gather and reflect the largest possible amount of light to the lens and (2) to occupy such a position that its image, projected by the lens, will fall over substantially the whole area of the scale 4.

The term "printing" as used herein refers to the preparation of positives which are themselves used as color images for superposition to form a color picture or are prepared with color and used as printing plates or are used to fix the intensity of color in other tissues, which latter are assembled superimposed to form a color picture. These positives may be on metal, transparent film of any suitable material, paper, glass, quartz, etc.

What I claim is:

1. The method of making a photographic reproduction of a desired range of intensities from a photographic negative which comprises exposing a photosensitive strip to the subject to be photographed, simultaneously photographing on said strip along with the image of the subject, an image of an approximately white object exposed through a graduated scale located in adjacent substantial parallel relation with said strip, said scale comprising tone areas progressively varying from approximate transparency to approximate opaqueness, developing said photographed strip to provide a negative, printing a positive from said negative, and developing said positive, the printing of said positive being effected so that a given tone in the printed image of the scale on the positive bears a definite intensity relation to a corresponding tone in a previously made print.

2. The method of making a photographic reproduction of a desired range of intensities from a photographic negative which comprises exposing a photosensitive strip to the subject to be photographed, simultaneously photographing on said strip along with the image of the subject, an image of an approximately white object exposed through a graduated scale located in adjacent substantial parallel relation with said strip, said scale comprising tone areas progressively varying from approximate transparency to approximate opaqueness, developing said photographed strip to provide a negative, printing a positive from said negative, and developing said positive, the printing of said positive being so effected that a given tone in the printed image of the scale on the positive bears a definite intensity relation to a prescribed tone value.

3. The method of making a colored photographic reproduction of an object which comprises exposing at least two photosensitive strips to the subject to be photographed, respectively thru at least one color filter, simultaneously photographing on each strip along with the image of the subject, an image of an approximately white object exposed through a graduated scale located in adjacent substantial parallel relation with said strip, said scale comprising tone areas progressively varying from approximate transparency to approximate opaqueness, developing said photographed strips to provide negatives, printing a positive from each negative, developing each positive, the printing of each of said positives being effected so that a given tone area in the scale image thereon bears a definite intensity relation to a corresponding tone area in the scale image on each of the other positives and is equal to a desired value, and utilizing said positives to produce a colored reproduction of said object.

4. The method of making a colored photographic reproduction of an object which comprises exposing at least two photosensitive strips to the subject to be photographed respectively thru at least one color filter, simultaneously photographing on each strip along with the image of the subject, an image of an approximately white object exposed through a graduated scale located in adjacent substantial parallel relation with said strip, said scale comprising tone areas progressively varying from approximate transparency to approximate opaqueness, developing said photographed strips to provide negatives, printing a positive from each negative, developing each positive, the printing of each of said positives being effected so that a given tone area in the scale image thereon bears a definite intensity relation to a corresponding tone area in the scale image on each of the other positives and is equal to a desired value, treating each positive to form a matrix and utilizing said matrices to apply appropriate dyes in superimposed relation on a dye receptive strip.

5. In combination with a camera, means for supporting a photosensitive strip in said camera, and a graduated gray tone scale comprising areas varying in intensity from approximate transparency to approximate opaqueness, means for supporting said scale in front of and in adjacent substantial parallel relation with respect to one margin of said strip, and means supported in a position outside of said camera for transmitting a band of light of substantially uniform intensity through said scale to said strip.

6. In combination with a camera, means for supporting a photosensitive strip in said camera, and a graduated gray tone scale comprising areas varying in intensity from approximate transparency to approximate opaqueness, means for supporting said scale in front of and in adjacent substantial parallel relation with respect to one margin of said strip, and means supported in a position outside of said camera and in proximity thereto for transmitting a band of light of substantially uniform intensity through said scale to said strip.

7. In combination with a camera, means for supporting a photosensitive strip in said camera, a graduated gray tone scale comprising areas varying in intensity from approximate transparency to approximate opaqueness, means for supporting said scale in front of and in adjacent substantial parallel relation with respect to one margin of said strip, and a horizontally extending rod supported from said camera with one end thereof projecting beyond the front of the camera, means rendering the projecting end of said rod vertically adjustable, means adjustably supported on the projecting end of said rod for transmitting white light through said scale to said strip.

8. In combination with a camera, a photosensitive strip including a picture portion and a marginal portion, means for supporting said strip in said camera, a graduated gray tone scale comprising areas varying in intensity from approximate transparency to approximate opaqueness, front of and in adjacent substantial parallel relation with respect to said marginal portion only of said strip, means for transmitting a band of light of substantially uniform intensity through said scale to said marginal portion only of said strip, and means for transmitting image-forming rays to the picture portion of said strip.

9. In combination with a camera for use in color separation photography by the use of color filters, a photosensitive strip including a picture portion and a marginal portion, means in said camera for supporting said photosensitive strip, a graduated tone scale mounted in said camera adjacent the marginal portion only of said photosensitive strip and substantially parallel thereto, said scale on a part thereof having a series of distinctive characters thereon respectively possessing selective color transmission properties which are approximately complementary to the respective colors of the series of filters with which they are to be used, means for transmitting a band of light of substantially uniform intensity thru said scale and distinctive characters to the marginal portion only of said strip, and means for transmitting image-forming rays to the picture portion of said strip.

10. In combination with a camera for use in color separation photography by the use of color filters, a photosensitive strip having a picture portion and a marginal portion, means in said camera for supporting said photosensitive strip, a support mounted in said camera adjacent the marginal portion only of said strip and substantially parallel thereto, said support on a part thereof having a series of distinctive characters thereon respectively possessing selective color transmission properties which are approximately complementary to the respective colors of the series of filters with which they are to be used, and means for transmitting light of substantially uniform intensity thru said distinctive characters to the marginal portion only of said strip, and means for transmitting image-forming rays to said picture portion of said strip.

11. In color separation photography the method of photographing a subject on a photosensitive strip through a filter and simultaneously obtaining an image of an identifying character on a margin of the strip for indicating the filter used, which method comprises photographing a subject on a photosensitive strip through a filter, and also simultaneously photographing on a marginal portion only of said strip an image of an approximate white object exposed thru said filter and thru a distinctive character supported adjacent to and in substantially parallel relation with said marginal portion only of said strip, which character possesses color transmission properties other than that of said filter whereby an image of said character useful for identifying the filter, is recorded upon said marginal portion only of said photosensitive strip.

12. In color separation photography the method of photographing a subject on a photosensitive strip thru a selective filter and simultaneously obtaining an image of an identifying character on a margin of the strip for indicating the filter used, which method comprises photographing a subject on a photosensitive strip through a selective filter, and also simultaneously photographing on a marginal portion only of said strip an image of an approximate white object exposed thru said selective filter and thru a distinctive character supported adjacent to and in substantially parallel relation with said marginal portion only of said strip, which character possesses color transmission properties substantially complementary of that of said filter whereby an image of said character useful for identifying the filter, is recorded upon said marginal portion only of said photosensitive strip.

13. In color separation photography, the method of photographing a subject on a series of photo-sensitive strips through selective filters and simultaneously obtaining an image of an identifying character on a margin of each of the strips which is useful for indicating the filter used for each of said strips, which method comprises photographing a particular subject on a plurality of photo-sensitive strips, each strip being exposed to the subject through a different filter, and also simultaneously phtographing on a marginal portion only of each of said strips an image of an approximate white object exposed thru the respective filters used for each of said strips and thru a plurality of distinctive characters supported in adjacent substantially parallel relation with said marginal portion only of said strips, said distinctive characters being of different shapes and each possessing different color transmission properties from the others, the color transmission properties of each character being substantially complementary to one of the filters, whereby an image of a different character, useful for identifying the filter used, is recorded upon a marginal portion only of each of said strips.

KENNETH L. HENDERSON.